US008606509B2

(12) United States Patent
Spinelli

(10) Patent No.: US 8,606,509 B2
(45) Date of Patent: *Dec. 10, 2013

(54) SOFTWARE BASED DRIVING DIRECTIONS

(75) Inventor: Thomas Spinelli, Northport, NY (US)

(73) Assignee: Omnitek Partners LLC, Ronkonkoma, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/550,516

(22) Filed: Jul. 16, 2012

(65) Prior Publication Data

US 2012/0283949 A1    Nov. 8, 2012

Related U.S. Application Data

(63) Continuation of application No. 12/645,461, filed on Dec. 22, 2009, now Pat. No. 8,224,569, which is a continuation of application No. 11/250,715, filed on Oct. 14, 2005, now Pat. No. 7,640,100.

(51) Int. Cl.
*G01C 21/30* (2006.01)

(52) U.S. Cl.
USPC ............... 701/410; 701/412; 701/428

(58) Field of Classification Search
USPC .......... 701/409–421, 425, 431, 454, 455; 340/988–990
See application file for complete search history.

(56) References Cited

U.S. PATENT DOCUMENTS

2003/0216834 A1* 11/2003 Allard .................... 700/245
2004/0167715 A1*  8/2004 Miwa ..................... 701/213

* cited by examiner

*Primary Examiner* — Richard Camby

(57) ABSTRACT

A method for electronically generating driving directions without text entry. The method including: indicating a starting address or starting location on a map without text entry; indicating an ending address or ending location on a map without text entry; and generating driving directions based on the indicated starting address or starting location and ending address or ending location.

4 Claims, 2 Drawing Sheets

SOFTWARE BASED DRIVING DIRECTIONS

CROSS-REFERENCE TO RELATED APPLICATIONS

This application is a continuation application of U.S. application Ser. No. 12/645,461 filed on Dec. 22, 2009 and issuing as U.S. Pat. No. 8,224,569 on Jul. 17, 2012, which is a continuation application of U.S. application Ser. No. 11/250,715 filed on Oct. 14, 2005 and issuing as U.S. Pat. No. 7,640,100 on Dec. 29, 2009, the entire contents of which is incorporated herein by reference.

BACKGROUND OF THE INVENTION

1. Field of the Invention

The present invention relates generally to software for driving directions and, more particularly, to methods for providing driving directions over an Internet web site.

2. Prior Art

Obtaining driving directions from software or at an Internet web site are well known in the art. Examples of web sites which offer such services are Mapquest, Mapblaster, Yahoo and Rand McNally. Generally, a user enters a starting address and an ending address and software or other algorithm generates driving directions and displays the same to the user. When generating such directions, the software or algorithm uses a system to determine what routes are best, such as a weighting system which assigns certain weights to different types of roads, such as small roads, secondary roads, and parkways/highways/expressways (collectively referred to herein as highways). Depending on the distance between the starting and ending address, the software or algorithm may generate directions with or without highway travel.

Although such directions are very useful, a user cannot customize the directions to suit his/her particular needs and needs to enter very specific instructions for starting and ending addresses.

SUMMARY OF THE INVENTION

Accordingly, a method for electronically generating driving directions without text entry is provided. The method comprising: indicating a starting address or starting location on a map without text entry; indicating an ending address or ending location on a map without text entry; and generating driving directions based on the indicated starting address or starting location and ending address or ending location.

The starting address can be indicated on a first map and the ending address can be indicated on the first map.

The method can further comprise indicating an intermediate address or location on the map where the generating generates driving directions from the starting address or location to the intermediate address and location and from the intermediate address or location to the ending address or location. The intermediate address can be indicated on the same map as one of the starting and ending address. The intermediate address can be indicated on a different map as one of the starting and ending address.

The indicating can comprise clicking on the starting address or location on the map and clicking on the ending address or location on the map.

The indicating can comprise clicking on the starting address or location on the map and dragging to the ending address or location on the map.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Although the present invention is applicable to numerous types of software and web-based services, it is particularly useful in the environment of the Internet. Therefore, without limiting the applicability of the present invention to the Internet, it will be described in such environment. Those skilled in the art will appreciate that the methods of the present invention can be carried out by any stand-alone software, for use on PC's, cell phones, PDA's and the like in which directions are obtained from a database map or on web-based systems such as an Internet or a local intranet.

Figure 1:
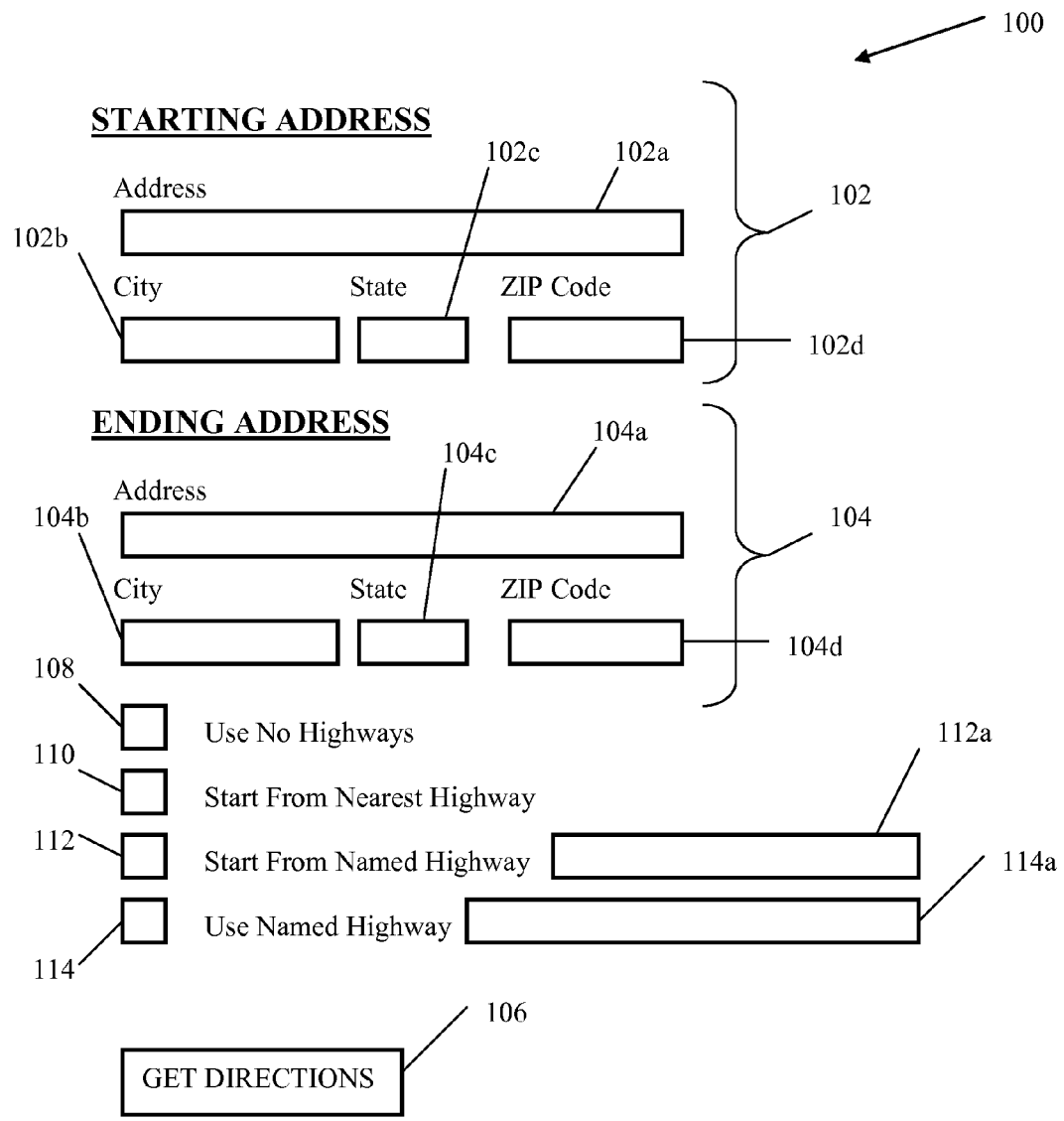
FIG. 1 illustrates a user-interface for driving directions according to a first embodiment.

Referring now to FIG. 1, a user interface is shown therein for use with software or algorithm (collectively referred to as software) for generating driving directions, the user interface being generally referred to by reference numeral 100. The user interface 100 can be displayed on any type of display, such as a television, PC or laptop monitor, cell-phone display, PDA display and the like. The user-interface 100 can also be displayed in a window or as a web page.

The user-interface has a portion 102 for entering a starting address and a portion 104 for entering an ending address. Such portions 102, 104 can have text boxes corresponding to an address 102a, 104a, city 102b, 104b, state 102c, 104c, and ZIP code 102d, 104d. The user interface can also have a button 106 or other means for instructing the software to input the entered starting and ending address and to generate driving instructions based thereon. Algorithms for generating driving directions based on a starting and ending address are well known in the art. The user-interface may have other options which are not shown in FIG. 1, such as entering the starting or ending addresses from a list of saved addresses or recently used addresses, entering a landmark, such as an airport as the starting or ending address, entering a latitude/longitude as the starting and/or ending address and requesting either the fastest route or the shortest route. The user-interface may also allow the user to select displaying a map along with the generated driving directions.

The driving directions generated generally include step-by-step directions for getting from the starting address to the ending address, including any highways if the distance or other variable associated with the trip merits the same. Other considerations may also be used for determining whether highways are part of the generated directions, such as proximity to either the starting or ending address. However, the user has no input into whether highways are part of the generated directions or which highways are part of the generated directions.

Therefore, the user interface can include an instruction, such as a check box 108 for instructing the software or algorithm to not use any highways in the generation of the directions. For example, the user may not like to drive on highways because they are a new driver, or they do not like to drive fast, or because the highways are crowded or closed due to an accident or construction. Therefore, the user can obtain driving directions without any highways where the software or algorithm would otherwise indicate one or more highways. Similarly, the user can indicate that no other types of roads be used in generating the driving directions, such as no secondary roads, or rural roads, or interstates.

The user-interface can also include an instruction, such as a check box 110 for instructing the software or algorithm to provide directions that start from the highway nearest to the starting address. For example, users often need directions from their home or work starting address and know how to get to the nearest highway. Therefore, the directions from the starting address to the nearest highway is often not necessary.

The user-interface can also include an instruction, such as a check box 112 for instructing the software or algorithm to provide directions that start from a named highway (or other named road) that is entered in a corresponding text box 112a. Similarly, the user-interface can also include an instruction, such as a check box 114 for instructing the software or algorithm to provide directions that use a named highway (or other named road) that is entered in a corresponding text box 114a. For example, users may prefer one highway or road over another even though it may not provide the fastest or shortest route to the ending address, possibly because the user has to run an errand or make a stop at a location that is not along the fastest or shortest route between the starting and ending locations.

Those skilled in the art will appreciate that the check boxes 108-114 can be replaced with other means well known in the software/programming arts, such as a touch screen, voice commands or other clicking type commands, such as by clicking on a particular highway on a map provided on the user-interface to indicate that the directions should begin or end at such road, or highlighting an area on a map for generating directions, or after generation of full directions, clicking on a particular step to indicate that the directions should be re-generated and any prior or subsequent steps are to be eliminated or highlighting, checking, or otherwise indicating a selected number of steps and regenerating the directions to only include such steps.

Of course, one or more of such features may be provided with the user interface, and one or more of the features, where not inconsistent, can be used simultaneously.

The user may also want driving instructions that includes less then all of the steps that is otherwise generated by the software or algorithm, either at the beginning, middle and/or end of the generated directions. In such a situation, the user can instruct the software or algorithm to provide directions that does not include the full generated direction steps by any indication means known in the art, such as by clicking on a particular highway or road on a map provided on the user-interface to indicate that the directions should begin or end at such road. Also, after generation of full directions between the starting and ending addresses, clicking on a particular step in a display of the full directions to indicate that the directions should be regenerated and any prior or subsequent steps are to be eliminated. Furthermore, the user can highlight, check, or otherwise indicate a selected number of steps and regenerate the directions to only include such steps.

Figure 2:
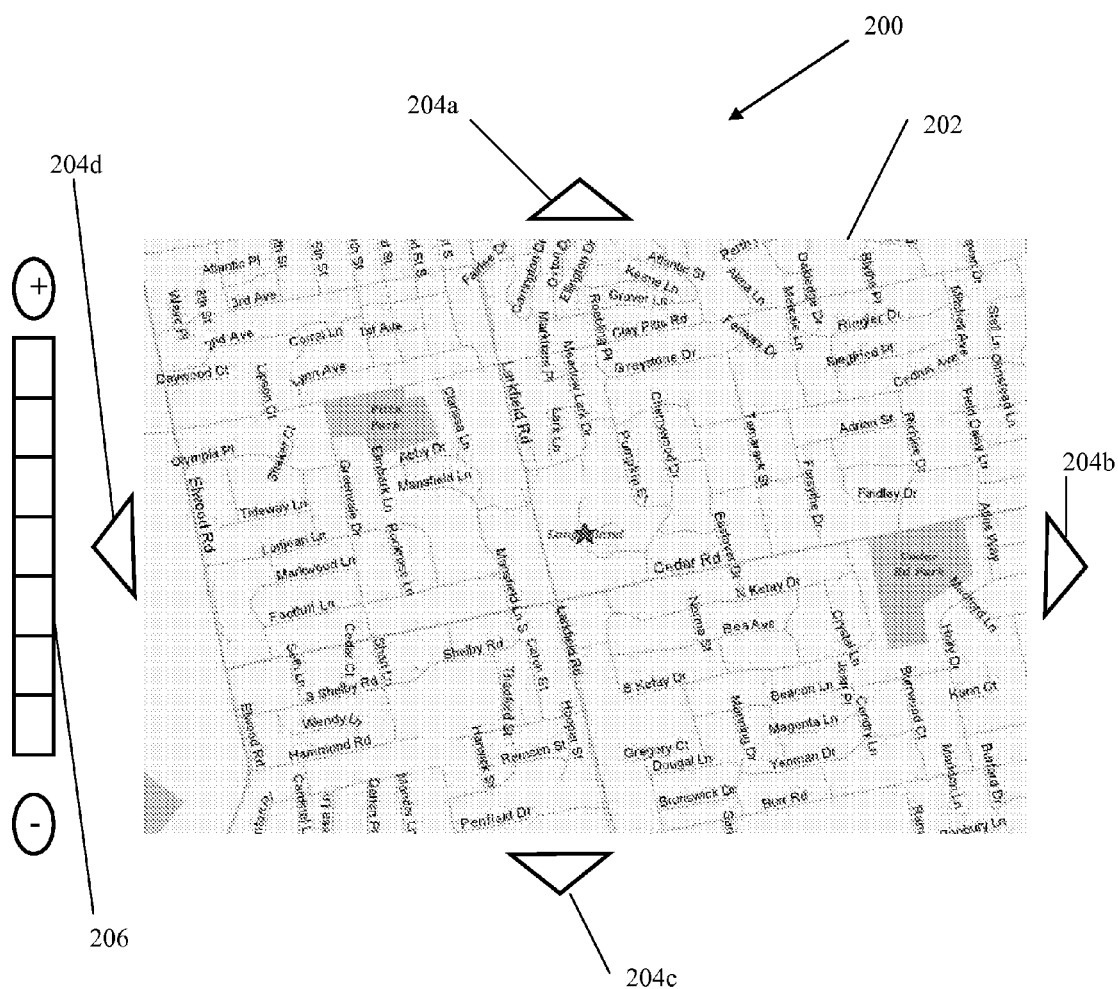
FIG. 2 illustrates a user-interface for driving directions according to a second embodiment.

Referring now to FIG. 2, a user interface is shown therein for use with software for generating driving directions, the user interface being generally referred to by reference numeral 200. The user interface 200 can be displayed on any type of display, such as a television, PC or laptop monitor, cell-phone display, PDA display and the like. The user-interface 200 can also be displayed in a window or as a web page.

FIG. 2 illustrates a user interface 200 having a map 202 displayed thereon. The map 202 generally displays indicia such as roads, railroads, parks, airports, stadiums and other landmarks. The indicia generally have names displayed, such as road names, town names, highway names and exit names, railroad names and stops, park and lake names and the like. The user-interface 200 can also include means for traversing the map 202, such as directional buttons 204a-d and zoom bar 206 for zooming in or out. The map 202 can be generated by entering an address, by simply entering a town, city, or state name, by entering a zip code and the like.

Directions from a starting location to an ending location can then be generated by software by indicating the starting address/location and ending address/location on the map, which can include any of the landmarks discussed above. An intermediate address/location between the starting and ending addresses/locations can also be indicated. Such indication can be a first click at the starting address/location and a subsequent click on an ending address/location, which serves to input such starting and ending addresses/locations to the software or algorithm for generation of the directions. The second click can also be at the intermediate address/location and a third click can be at the ending address/location. Such indication can also be a click at the starting address/location and a drag to an ending address/location, which serves to input such starting and ending addresses/locations to the software or algorithm for generation of the directions. If an intermediate address/location is indicated, the generated directions will be from the starting address/location to the intermediate address/location and then to the ending address/location.

Thus, depending on the detail shown on the map (the degree to which it is zoomed in or out), the directions can be from a very specific starting and/or ending address/location or from a general starting and/or ending address/location. For example, if a user only needs general directions to a particular area, he/she can use the map to get directions to a particular street, town, zip code, park, lake, stadium etc. instead of to a very specific address (especially where a location, such as a lake does not generally have an address). Although FIG. 2 shows a single map, the starting, ending, and/or intermediate addresses/locations can be on different maps. Such different maps can be displayed simultaneously, such as in different windows on the same display or can be displayed sequentially.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for electronically generating driving directions without text entry, the method comprising:
  indicating a starting address or starting location on a map without text entry;
  indicating an ending address or ending location on a map without text entry;
  generating driving directions based on the indicated starting address or starting location and ending address or ending location; and
  indicating an intermediate address or location on the map where the generating generates driving directions from the starting address or location to the intermediate address and location and from the intermediate address or location to the ending address or location;
  wherein the intermediate address is indicated on a different map as one of the starting and ending address.

2. The method of claim 1, wherein the starting address is indicated on a first map and the ending address is indicated on the first map.

3. The method of claim 1, wherein the intermediate address is indicated on the same map as one of the starting and ending address.

4. The method of claim 1, wherein the indicating comprises clicking on the starting address or location on the map and clicking on the ending address or location on the map.

* * * * *